United States Patent [19]

Schmitt

[11] Patent Number: 5,080,538
[45] Date of Patent: Jan. 14, 1992

[54] METHOD OF MAKING A THREADED HOLE

[76] Inventor: M. Norbert Schmitt, Schwalbenweg 3, D-8501 Feucht, Fed. Rep. of Germany

[21] Appl. No.: 616,435

[22] Filed: Nov. 21, 1990

[30] Foreign Application Priority Data

Dec. 1, 1989 [DE] Fed. Rep. of Germany ....... 3939795

[51] Int. Cl.$^5$ .............................................. B23G 5/20
[52] U.S. Cl. ........................................ 409/66; 10/140
[58] Field of Search ...................... 409/74, 66; 10/140, 10/141 R; 408/222, 1 R

[56] References Cited

U.S. PATENT DOCUMENTS

| 4,761,844 | 8/1988 | Turchan | 409/74 X |
| 4,930,949 | 6/1990 | Giessler | 409/74 X |
| 4,943,191 | 7/1990 | Schmitt | 409/74 X |

Primary Examiner—William Briggs
Attorney, Agent, or Firm—Toren, McGeady & Associates

[57] ABSTRACT

There is a method of making a threaded hole in a workpiece 15 whereby a core hole 9 is produced in the workpiece 15 with a combination drilling and thread milling tool 14 being advanced axially and threads are generated in the wall of the hole by a helical motion of the combination tool 14. It is desirable that the combination tool should be capable of making core holes whose diameter is greater than the drilling edge outer diameter of the combination tool. This is achieved in that the combination drilling and thread milling tool 14 in making the core hole 19 is moved on a helical path 11, 12 relative to the workpiece 15. Depending on the setting of the radius of the helical path, a different size inner diameter of the core hole is obtained.

1 Claim, 2 Drawing Sheets

METHOD OF MAKING A THREADED HOLE

DESCRIPTION

The invention relates to a method of making a threaded hole in a workpiece using a rotating combination drilling and thread-milling tool which is formed with a drilling edge and thread-milling teeth and where the outer diameter of the drilling edge is equal to or greater than the diameter of the thread-milling teeth, and where a core hole is first made in the workpiece by means of the drilling edge with the combination drill and milling tool advancing axially and then threads are generated in the wall of the hole by means of the thread-milling teeth with the combination tool performing a helical motion, and where a numerically controlled machine tool with three-axis control is used for the helical motion.

In a prior-art (U.S. Pat. No. 4,651,374) method of this kind, a combination drilling and thread-milling tool is moved only axially to make the core hole. According to that method, the combination tool permits core holes to be made only with one diameter which corresponds to the outer diameter of the drilling edge. In other words, a separate combination tool is required for each core hole diameter.

It is the object of the present invention to provide a method of the kind initially referred to whereby the combination drill and thread milling tool permits core holes to be produced whose diameter is greater than the drilling edge outer diameter of the combination drill and thread milling tool. In solving this problem, the method according to the invention is characterized in that the combination drill and thread milling tool is moved on a helical path relative to the workpiece to produce the core hole.

Since, in making the core hole, the drilling edge moves on a helical path, the diameter of the core hole is greater than the outer diameter of the drilling edge. Depending on the setting of the radius of the helical path, a different size inner diameter of the core hole is obtained. Thanks to the use of the helical path in making the core hole, the number of applications of the combination drilling and thread milling tool are increased. Since the machine which drives the combination tool is inherently capable of performing helical motions to generate the threads, it is possible to employ the existing machine tool and to obtain improved utilization. Strictly speaking, the center axis of the combination drilling and thread milling tool moves on the helical path and the other regions of the combination tool perform a motion which is composed of the helical path and the rotation.

The helical motion required for the helical path may be performed by the workpiece and, as a rule, would be made by the combination tool itself or may result from a combination of motions of the workpiece and the combination tool. If the radius of the helical motion is greater than the outer diameter of the drilling edge, then a pip may remain at the center when making the core hole by means of the helical motion. In this case, the procedure would be either for an initial hole to be made first. e.g. by means of the combination tool, down the center in order to avoid a pip being formed or a pip left would be removed by subsequent machining. The invention also comprises the machine tool which by virtue of a suitable control system operates according to the method featured by the invention.

A preferred embodiment of the invention is illustrated in the drawing in which

Figure 1:
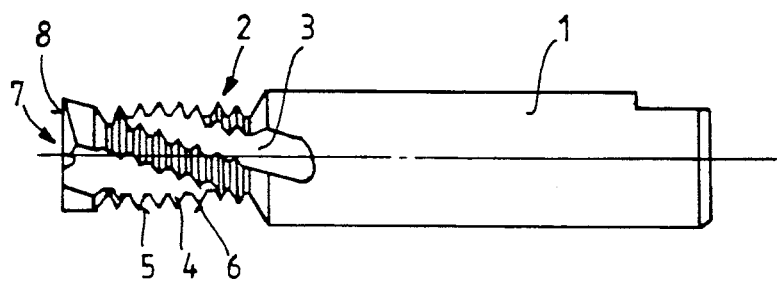
FIG. 1 is a side elevation of a combination drilling and thread milling tool.
Figure 2:
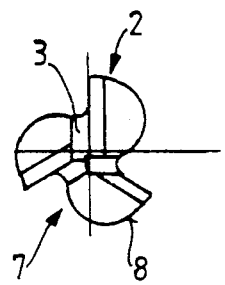
FIG. 2 is an end view of the combination tool shown in FIG. 1.
Figure 3:
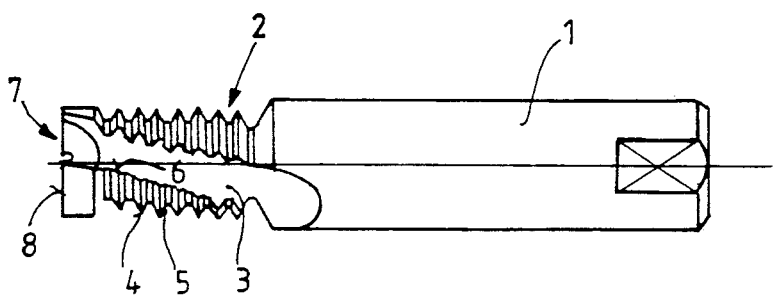
FIG. 3 is another side elevation of the combination tool shown in FIG. 1.
Figure 4:
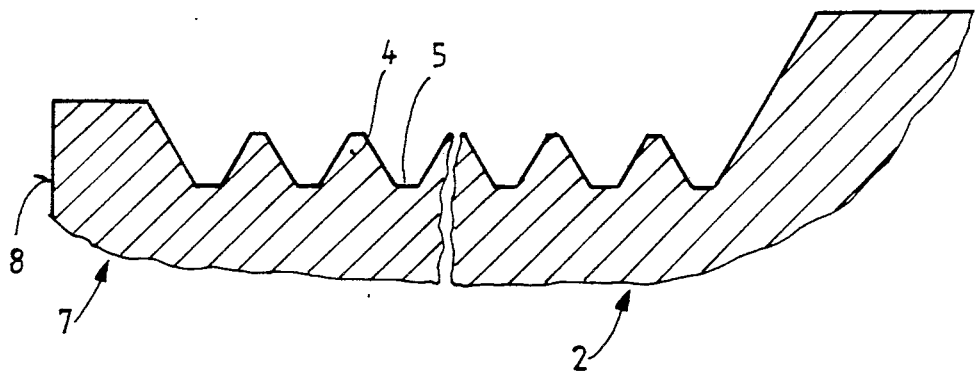
FIG. 4 is a longitudinal section through part of the combination tool drawn on an enlarged scale compared to FIG. 1.

The combination drilling and thread milling tool illustrated in FIGS. 1-4 is formed at its rear end with a shank 1 for insertion in a chuck of a tool spindle of a machine tool. Adjoining the shank 1 towards the front. there is a milling region 2 which is provided with three helical flutes 3 and two rows of thread-cutting teeth 4 arranged in series, the rows extending in an axial direction or rather in a helical direction. The threadcutting teeth 4 delimit a groove 5 each between them and form thread cutting edges 6. At its front end, the combination tool terminates in a tip 7 which is formed with drilling edges 8 which, to start with, extend as endcutting edges in a plane at right angles to the center axis and then after an acute angle continue on a peripheral surface to form side-cutting edges which cooperate in producing the core hole. As shown in FIG. 4, the thread-cutting teeth 4 arranged in a row are of equal size.

Figure 5:
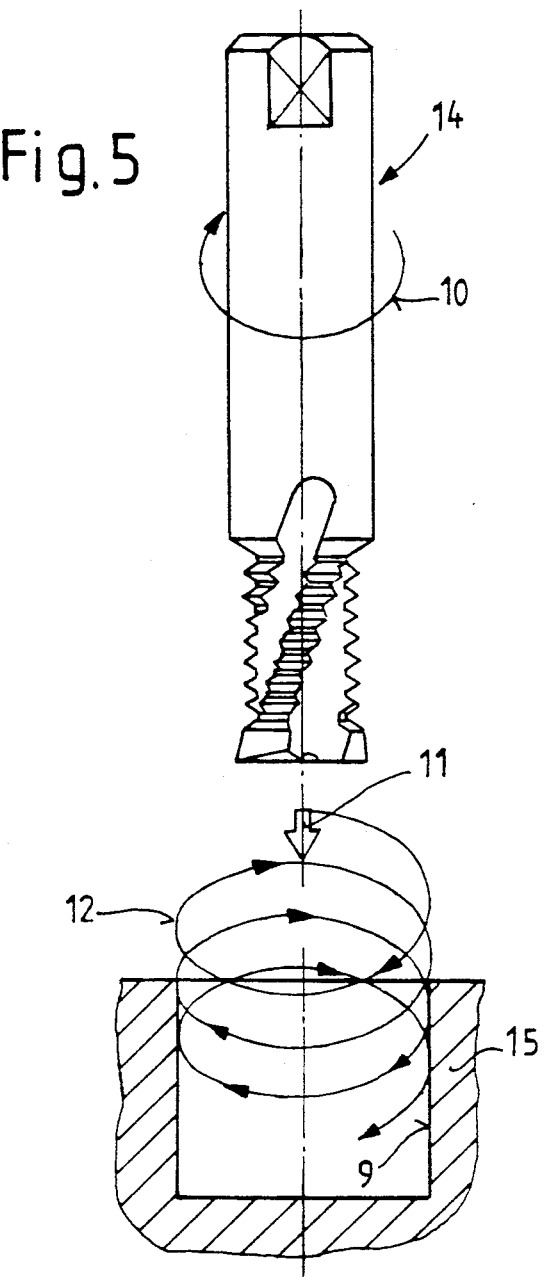
FIG. 5 is a schematic diagram showing the arrangement of the combination tool shown in FIG. 1 relative to a workpiece.
Figure 6:
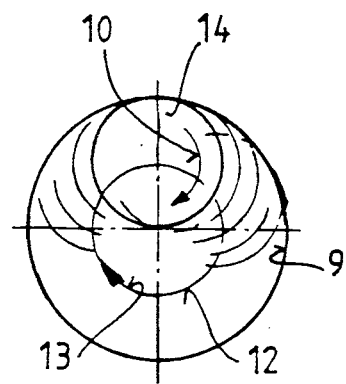
FIG. 6 illustrates the motion of the combination tool shown in FIG. 1 in producing a core hole.

According to FIGS. 5 and 6, the combination tool 14 in making a core hole 9 rotates in a workpiece 15 according to an arrow 10. In the process, the combination tool 14 is advanced along a helical path which is composed of an axial feed motion 11 and an orbital motion 12. Referring to FIG. 6, a circle 13 indicates the orbital motion of the center axis of the combination tool 14 relative to the core hole 9.

I claim:

1. A method for fabricating a threaded bore in a workpiece, comprising the steps of:
    providing a rotating drilling thread milling tool bit having end face drill cutting edges extending at right angles to a central axis of the milling tool bit, and front jacket cutting edges, the tool bit further having thread milling teeth in axial rows axially behind a drilling edge piece, the drill cutting edges having an external diameter at least as large as an external diameter of the thread milling teeth;
    providing a numerically controlled machine tool with a three-axis control;
    producing a core hole in the workpiece with the drill cutting edges by axially feeding the drilling thread milling tool bit and moving the drill thread milling tool bit upon a helical path having an adjusted radius with the numerically controlled machine tool, for generating the core hole, the numerically controlled machine tool having the capability of adjusting the radius of the helical path; and
    subsequently generating thread turns in a wall of the core hole with the thread milling teeth by helically moving the drilling thread milling tool bit upon a different helical path with the numerically controlled machine tool.

* * * * *